(12) United States Patent
Plaisted

(10) Patent No.: US 7,900,407 B2
(45) Date of Patent: Mar. 8, 2011

(54) INTERCONNECTED SOLAR MODULE DESIGN AND SYSTEM

(75) Inventor: Joshua Reed Plaisted, Oakland, CA (US)

(73) Assignee: PVT Solar, Inc., Berkeley, CA (US)

( * ) Notice: Subject to any disclaimer, the term of this patent is extended or adjusted under 35 U.S.C. 154(b) by 709 days.

(21) Appl. No.: 11/750,948

(22) Filed: May 18, 2007

(65) Prior Publication Data
US 2007/0251567 A1    Nov. 1, 2007

Related U.S. Application Data

(63) Continuation-in-part of application No. 11/332,000, filed on Jan. 13, 2006, which is a continuation-in-part of application No. 10/855,254, filed on May 26, 2004.

(60) Provisional application No. 60/747,593, filed on May 18, 2006, provisional application No. 60/824,744, filed on Sep. 6, 2006, provisional application No. 60/643,619, filed on Jan. 13, 2005, provisional application No. 60/544,753, filed on Feb. 13, 2004.

(51) Int. Cl.
*H01L 35/02* (2006.01)
*H01L 31/42* (2006.01)

(52) U.S. Cl. ...................... 52/173.3; 249/219.1; 136/244; 136/251; 52/633; 52/656.1; 52/656.2; 52/656.5; 52/656.9

(58) Field of Classification Search .................. 52/173.3, 52/633, 656; 249/219.1; 136/244, 251, 206, 136/230
See application file for complete search history.

(56) References Cited

U.S. PATENT DOCUMENTS

| | | | |
|---|---|---|---|
| 1,159,372 A | 10/1915 | Golf |
| 1,306,434 A | 6/1919 | Melanson |
| 2,747,166 A | 5/1956 | Hoffarth |
| 3,881,799 A | 5/1975 | Elliott et al. |
| 4,029,080 A | 6/1977 | Warren |
| 4,061,413 A | 12/1977 | Keller |
| 4,150,660 A | 4/1979 | Peters et al. |
| 4,239,555 A | 12/1980 | Scharlack et al. |
| 4,336,413 A | 6/1982 | Tourneux |

(Continued)

FOREIGN PATENT DOCUMENTS
DE        19804685 A1      8/1999
(Continued)

OTHER PUBLICATIONS

International Search Report and Written Opinion of the International Searching Authority in International Application PCT/US2006/001593, World Intellectual Property Organization, Oct. 27, 2006, 19 pages.

(Continued)

*Primary Examiner* — Richard E Chilcot, Jr.
*Assistant Examiner* — Mark R Wendell
(74) *Attorney, Agent, or Firm* — Mahamedi Paradice Kreisman LLP

(57) ABSTRACT

A frame assembly is provided for a solar module. The frame assembly includes a plurality of frame members that are structured to collectively support and hold a first solar panel. At least one of the plurality of frame members is structured to adjoin a frame member of a second solar module in forming a joining with the frame member of the second solar module over a length where the frame member of the first and second solar module adjoin.

28 Claims, 9 Drawing Sheets

U.S. PATENT DOCUMENTS

| | | | |
|---|---|---|---|
| 4,372,292 A | 2/1983 | Ort | |
| 4,636,577 A | 1/1987 | Peterpaul | |
| 4,936,063 A | 6/1990 | Humphrey | |
| 4,961,712 A | 10/1990 | Schwenk et al. | |
| 4,993,959 A | 2/1991 | Randollph | |
| 5,180,442 A | 1/1993 | Elias | |
| 5,338,369 A | 8/1994 | Rawlings | |
| 5,409,549 A | 4/1995 | Mori | |
| 5,451,167 A | 9/1995 | Zielinski et al. | |
| 5,497,587 A | 3/1996 | Hirai et al. | |
| 5,524,401 A | 6/1996 | Ishikawa et al. | |
| 5,571,338 A | 11/1996 | Kadonome et al. | |
| 5,603,187 A | 2/1997 | Merrin et al. | |
| 5,687,453 A | 11/1997 | Megregian et al. | |
| 5,740,996 A | 4/1998 | Genschorek | |
| 5,788,204 A | 8/1998 | Goodwin et al. | |
| 5,851,309 A | 12/1998 | Kousa | |
| 5,924,486 A | 7/1999 | Ehlers et al. | |
| 5,986,203 A | 11/1999 | Hanoka et al. | |
| 6,106,310 A | 8/2000 | Davis et al. | |
| 6,195,066 B1 | 2/2001 | Pegues et al. | |
| 6,201,179 B1 | 3/2001 | Dalacu | |
| 6,269,596 B1 | 8/2001 | Ohtsuka et al. | |
| 6,283,770 B1 | 9/2001 | Leung et al. | |
| 6,320,120 B1 | 11/2001 | Van Haaster | |
| 6,323,478 B1 | 11/2001 | Fujisaki et al. | |
| 6,366,304 B1 | 4/2002 | Nakayasu et al. | |
| 6,465,724 B1 | 10/2002 | Garvison et al. | |
| 6,521,821 B2 | 2/2003 | Makita et al. | |
| 7,012,188 B2 | 3/2006 | Erling | |
| 7,293,748 B1 | 11/2007 | Hoser | |
| 7,406,800 B2 * | 8/2008 | Cinnamon et al. | 52/173.3 |
| 7,419,377 B1 | 9/2008 | Briere et al. | |
| 7,469,508 B2 | 12/2008 | Ceria | |
| 7,592,537 B1 * | 9/2009 | West | 136/251 |
| 7,721,492 B2 | 5/2010 | Plaisted et al. | |
| 2002/0078991 A1 * | 6/2002 | Nagao et al. | 136/251 |
| 2003/0010372 A1 | 1/2003 | Dinwoodie | |
| 2003/0015637 A1 | 1/2003 | Liebendorfer | |
| 2003/0071177 A1 | 4/2003 | Aussiker | |
| 2003/0094193 A1 | 5/2003 | Mapes et al. | |
| 2003/0201009 A1 | 10/2003 | Nakajima et al. | |
| 2004/0011354 A1 | 1/2004 | Erling | |
| 2004/0163338 A1 | 8/2004 | Liebendorfer | |
| 2005/0161074 A1 | 7/2005 | Garvison et al. | |
| 2005/0257453 A1 * | 11/2005 | Cinnamon | 52/173.3 |
| 2006/0032527 A1 | 2/2006 | Stevens et al. | |
| 2006/0042682 A1 | 3/2006 | Wolfe et al. | |
| 2006/0086382 A1 | 4/2006 | Plaisted | |
| 2006/0118163 A1 | 6/2006 | Plaisted et al. | |
| 2006/0124167 A1 | 6/2006 | Fan et al. | |
| 2007/0295391 A1 | 12/2007 | Lenox et al. | |
| 2008/0053009 A1 | 3/2008 | Plaisted | |
| 2008/0053517 A1 | 3/2008 | Plaisted | |
| 2008/0121273 A1 | 5/2008 | Plaisted | |
| 2008/0169018 A1 | 7/2008 | Miyamoto et al. | |
| 2009/0019796 A1 | 1/2009 | Liebendorfer | |
| 2009/0038668 A1 | 2/2009 | Plaisted | |

FOREIGN PATENT DOCUMENTS

| | | |
|---|---|---|
| EP | 0417303 A1 | 3/1991 |
| EP | 0587348 A2 | 3/1994 |
| EP | 0599497 A1 | 6/1994 |
| EP | 0614058 A2 | 9/1994 |
| EP | 0905795 A2 | 3/1999 |
| EP | 1873843 A2 | 1/2007 |
| JP | 09-184209 A | 7/1997 |
| JP | 10-159201 A | 6/1998 |
| JP | 11-186586 A | 7/1999 |
| JP | 11-204819 A | 7/1999 |
| JP | 2000-100490 A | 4/2000 |
| JP | 2001-214579 A | 8/2001 |
| JP | 2001-262800 A | 9/2001 |
| JP | 2004-251037 A | 9/2004 |
| JP | 2005-194771 A | 7/2005 |
| JP | 2007-262764 A | 10/2007 |
| WO | WO 0241407 | 5/2002 |

OTHER PUBLICATIONS

Communication Pursuant to Article 94(3) EPC in Application No. 06733720.-1266, European Patent Office, Jul. 16, 2008, 6 pages.
Final Office Action dated Oct. 6, 2008 in U.S. Appl. 10/855,254, 21 pgs.
International Preliminary Report on Patentability in International Application PCT/US2006/001593, World Intellectual Property Organization, Jul. 26, 2007, 11 pages.
International Search Report and Written Opinion of the International Searching Authority in International Application PCT/US2007/77433, World Intellectual Property Organization, Mar. 26, 2006, 10 pages.
Non-Final Office Action Dated Jun. 1, 2009 in U.S. Appl. 10/855,254, 17 pgs.
Non-Final Office Action dated Jun. 22, 2009 in U.S. Appl. 11/332,000, 13 pages.
Non-Final Office Action dated Nov. 13, 2008 in U.S. Appl. 11/851,299, 9 pgs.
Telestrut Telescoping Strut; Unistrut; http://web.archive.org/web/20030202040614/http://www.unistrut.com/.
Unistrut Telespar Telescoping Tubing; Unistrut; http://web.archive.org/web/20030202040614/http://www.unistrut.com/.
USPTO Office Action, Jan. 24, 2008.
U.S. Appl. No.12/761,325, filed Apr. 15, 2010, Plaisted.
Communication Pursuant to Article 94(3) EPC in Application No. 06733720.4-1266, European Patent Office, May 25, 2010.
Final Office Action dated Dec. 7, 2009 in U.S. Appl. No. 11/332,000, 11 pgs.
Final Office Action dated Dec. 4, 2009 in U.S. Appl. No. 10/855,254, 18 pgs.
International Preliminary Report on Patentability in International Application PCT/US2007/075531, World Intellectual Property Organization, Oct. 15, 2009, 8 pages.
International Search Report and Written Opinion of Sep. 30, 2009 10 pages.
International Search Report and Written Opinion of the International Searching Authority in International Application PCT/US2007/69304, World Intellectual Property Organization, Mar. 4, 2008, 12 pages.
Non-Final Office Action dated Jul. 12, 2010 in U.S. Appl. No. 11/848,766.
Non-Final Office Action dated Aug. 2, 2010 in U.S. Appl. No. 10/855,254; 28 pgs.
Non-Final Office Action dated Mar. 15, 2010 in U.S. Appl. No. 11/750,948; 9 pgs.
Non-Final Office Action dated Jan. 13, 2010 in U.S. Appl. No. 11/947,658 pgs.
Notice of Allowance dated Jul. 12, 2010 in U.S. Appl. No. 11/947,658.
Notice of Allowance dated May 6, 2010 in U.S. Appl. No. 11/332,000.
Notice of Allowance mailed Jan. 11, 2010 in U.S. Appl. No. 11/851,299; 8 pgs.
Notice of Allowance dated Sep. 27, 2010 in U.S. Appl. No. 11/332,000.
Non-Final Office Action dated Nov. 9, 2010 in U.S. Appl. No. 11/836,140.

* cited by examiner

INTERCONNECTED SOLAR MODULE DESIGN AND SYSTEM

PRIORITY APPLICATIONS

This application claims benefit of priority to Provisional U.S. Patent Application No. 60/747,593, filed May 18, 2006, entitled DESIGN FOR INTERCONNECTING SOLAR MODULES; the aforementioned priority application is hereby incorporated by reference in its entirety for all purposes.

This application also claims benefit of priority to Provisional U.S. Patent Application No. 60/824,744, filed Sep. 6, 2006, entitled METHOD OF INSTALLING MOUNTING CHANNELS ON BUILDING FACADES; the aforementioned priority application being hereby being incorporated by reference.

This application also is a continuation-in-part of U.S. patent application Ser. No. 11/332,000, filed Jan. 13, 2006, entitled RACK ASSEMBLY FOR MOUNTING SOLAR MODULES; which (i) claims benefit of priority to Provisional U.S. Patent Application No. 60/643,619, filed Jan. 13, 2005, entitled PV/THERMAL INTEGRATED ENERGY SUPPLY SYSTEM, and (ii) is a continuation-in-part of U.S. patent application Ser. No. 10/855,254, filed May 26, 2004, entitled MECHANISM FOR MOUNTING SOLAR MODULES, which claims benefit of priority to U.S. Patent Application No. 60/544,753, filed Feb. 13, 2004, entitled SYSTEM, METHOD, AND APPARATUS FOR MOUNTING A SOLAR MODULE. All of the aforementioned priority applications named in this paragraph are hereby incorporated by reference in their entirety for all purposes.

TECHNICAL FIELD

The disclosed embodiments relate generally to the field of solar modules. In particular, the disclosed embodiments relate to interconnected solar modules and a system for interconnecting solar modules.

BACKGROUND

Modules for converting solar energy into useful forms of energy such as heat and electricity have been in existence for many years. Because of the sun's low energy intensity and the moderate conversion efficiency of solar modules, a large array of solar modules is often required to service the end-use of the energy. Array areas from several dozen square feet to several thousand square feet are common. A thermal solar module may consist of a glazing surface and an absorber below the glazing surface. A perimeter frame is usually used to fix the glazing surface and absorber in relation to one another and to serve as a structural element for the thermal module. Moreover, the variety of surfaces on which the modules may be mounted requires a wide range of flexibility and adaptability in the methods of interconnecting the solar modules to form an array.

Another example of a solar module is a solar photovoltaic (PV) module, which consists of a series of PV cells connected in a series and parallel combination to yield a specific current and voltage output. Due to the fragility of the cells and the harsh environmental conditions they are often exposed to, the assembly of cells is often encapsulated into a rigid laminate. Most PV laminates are fabricated from a glass cover, an active layer containing the PV cells, and a back cover. While PV laminates can be directly attached to a mounting structure, it is more common for them to be framed before mounting. PV laminate frames typically consist of aluminum extrusions with an upper cavity that receives the laminate when assembled. The frame serves the purpose of increasing the rigidity of the laminate and to protect the fragile glass edge of the laminate from cracking. Frames for PV modules often include a lower flange with pre-drilled holes for affixing them to mounting structures.

Because PV modules must be electrically interconnected, they are often mounted in strings where the modules are assembled end to end to form a row of modules. Due to the fact that most mounting surfaces such as roofs are square or rectangular in nature, most PV module installations consist of multiple rows assembled in close proximity to match the general footprint of the surface on which they are mounted. Such arrangements of multiple rows of modules are generally referred to as an array.

Solar PV modules are typically constructed of a simple metal frame surrounding the PV laminate sheet that encapsulates the active solar cells. The electrical connections representing the positive and negative module outputs are often provided in the form of quick disconnect connections such as those manufactured by Multi-Contact of Santa Rosa Calif. These quick-disconnect fittings are usually provided on the ends of lead wires 2-4' in length to allow two adjacent PV modules to be connected together.

The assembly of loose connections results in wasted time during the assembly of the solar PV modules into a larger array as the fittings must be found, connected, and any slack in the lead wires must be coiled and secured to prevent possible abrasion and shorting against the underlying mounting surface. Additionally, to prevent the quick-connects from coming undone in the field, some variants employ locking features at additional cost and complexity of installation.

In addition to connecting the voltage outputs of each solar PV module, most some electrical codes require that the module frames themselves be electrically grounded. This is often achieved by fixing a bare copper conductor to each module frame by means of a screw and washer. The grounding of module frames can be as time consuming as the wiring of the voltage outputs.

When installing the modules outlined above into a racking system, a specific order of assembly is often performed. When installing multiple modules, one often places the new solar PV module on the rack a few feet from the previously installed solar PV module. Then one must step between the two modules and reach underneath the previously installed module to acquire the free lead wire from the back of the module and then reach underneath the new module and acquire the wire of the desired polarity from the back of the new module and connect these two wires. The connectors are usually of the quick-disconnect type described above and require two free hands to connect, which can be problematic if a spare hand is necessary to hold tooling or an unsecured module on a sloped roof. The loose wire on both modules should be neatly coiled up and tied with twist ties or zip ties. The wires also should be prevented from touching or resting on the roof. Over time, wind will brush the wires across the roof surface and abrade the insulation causing exposure of the conductor and possible shorting.

Keeping to some electrical codes, all modules must be grounded to an acceptable ground source. Therefore the new module must be grounded to the entire array by connecting it to a separate bare grounding wire that is running through the array. The grounding wire would be attached to the previously installed module and the loose end must be brought close to the mounting position on the new module. A wire clamp must be attached to the frame of the new module with a screw. Then the wire must be looped through the wire clamp on the new module and then fastened into the clamp.

In the last step, one must step away from the gap between the two modules and the new module is pushed up against the previous module and mounted to the racking structure.

DETAILED DESCRIPTION

Embodiments described herein provide a solar module assembly, and primary support structures for supporting solar modules in an assembly, that prevent or hinder intrusion of water or debris within a gap that is formed by adjacent solar modules.

An embodiment includes a frame assembly for a solar module. The frame assembly includes a plurality of frame members that are structured to collectively support and hold a first solar panel. At least one of the plurality of frame members is structured to adjoin a frame member of a second solar module in forming a joining with the frame member of the second solar module over a length where the frame member of the first and second solar module adjoin.

According to another embodiment, a frame assembly for a solar module includes a plurality of frame members that are structured to collectively support and hold a first solar panel. The plurality of frame members includes a first frame member that provides an overlap frame thickness a distance outward from the first frame member. The overlap frame thickness is extended outward in a lengthwise direction of the first frame member. The plurality of frame members includes a second frame member that includes a perimeter recessed platform that is extended in a lengthwise direction of the second member, wherein the recessed platform is provided against an exterior surface of the second frame member to define a depth distance between the recessed platform and the exterior surface.

In another embodiment, a solar module assembly includes a plurality of solar modules, primary support structures, and a sealing feature. The frame assembly includes a plurality of frame members, including multiple sets of frame members. Each set of frame members may combine to support a corresponding solar panel in position. The plurality of frame members include a pair of adjoining frame members. The pair of adjoining frame members include a frame member of a first set of frame members that adjoins a frame member of a second frame member. The sealing feature provided for the pair of adjoining frame members to substantially preclude intrusion of at least one of external air or water into a space underlying a solar module of the first set or of the second set.

As used herein, the term "solar module" means the combination of a solar collective panel (e.g. photovoltaic laminate containing solar cells, glazed component, or other absorber/generating elements) and frame members that retain the panel. A solar module may utilize solar energy for any purpose, including generating electricity (i.e. Solar PV) and thermal energy.

Overview

Figure 1A:
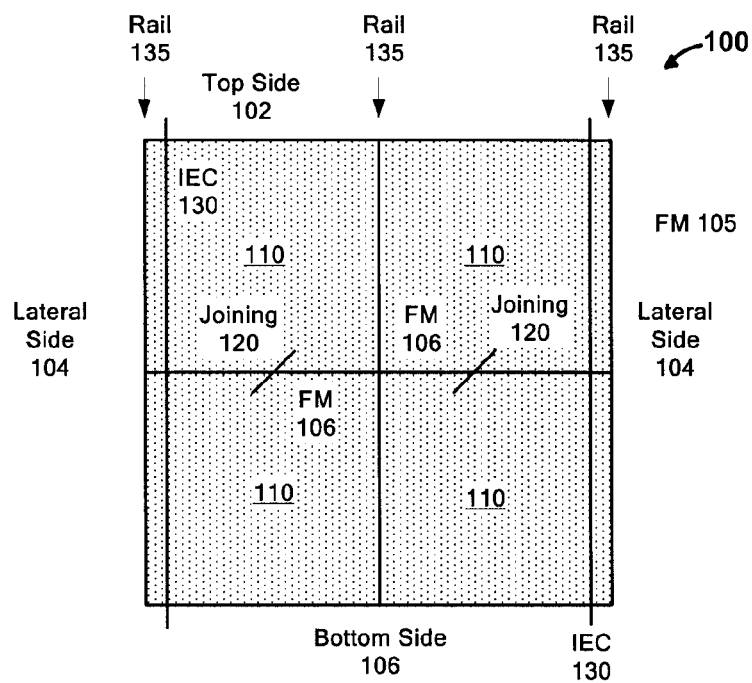
FIG. 1A is a simplified illustration of solar panels together with associated frame members assembled into an array and constructed under one or more embodiments of the invention.

FIG. 1A is a Simplified Illustration of a Solar Panel Assembly Constructed Under one or more embodiments of the invention. In an embodiment, an array 100 includes a plurality of frame members that assemble to support and hold a collection of solar modules 110 in position over an underlying surface. An embodiment of FIG. 1A illustrates use of four solar modules 110 in a rectangular arrangement, although more or fewer solar modules may be used, and in different configurations. As described, the underlying surface may correspond to a rooftop or other similar surface. Though not required to be mounted on an inclined surface, one or more embodiments contemplate use of an inclined underlying surface for the mounting of the array of solar modules.

FIG. 1A may be described in reference to a vertical and horizontal direction. The designation of horizontal and vertical directions may be arbitrary, but for purpose of an implementation such as described with FIG. 1A, the vertical direction also coincide with the direction of support structures for the array as a whole. In one embodiment, the array 100 includes rails 135 or other primary support structures that are vertically aligned. With this reference and configuration, the frame members include vertical frame members 105 which extend co-linearly with the rails 135, and horizontal frame members 106 which span between the vertical frame members 105. In one embodiment, vertical frame members 105 are extended, integrated or coupled with rails 135 or other support structures. As mentioned, the rails 135 may form a primary securement of the array 100 against an underlying surface. The horizontal frame members 106 extend between vertical frame members 105. In an embodiment, each column of the array 100 is separated by a rail 135, from which one or more vertical frame members 105 are provided.

Within each column, rows comprising individual solar panels 110 adjoin one another via horizontal frame members 106. In an embodiment, adjoining horizontal frame members within a column are individually or pair-wise structured, or otherwise configured (e.g. through provision of structural or additional features), to form a joining 120. Such adjoining horizontal frame members 106 are also interior frame members. As described with one or more embodiments, the joining 120 may abut the horizontal frame members 106 in a manner that provides a seal or weather-proofing.

The array 100 may be defined by a perimeter or boundary that includes a top side 102, a pair of lateral sides 104, and a bottom side 106. According to an embodiment, at least some of the frame members 105, 106 include or are combined with structures and/or features that seal or weather protect portions of the perimeter to the underlying surface. In one embodiment, the frame members 105, 106 include and/or are combined with flashing and counter-flash structures that are supported on the underlying surface. Portions of the perimeter that may be sealed include the top side 102, as well as the lateral sides 104. As will be described, the perimeter sealing may form one facet in a design in which water may be directed or moved over or around the solar modules 110 while maintaining weather proofing for the assembly as a whole. The water may result from precipitation, or through the accumulation of water, ice or snow. Additionally, dirt or other unwanted debris may be included in the water.

Accordingly, horizontal frame members 106 that serve to support adjoining solar modules 110 may be constructed or combined so as to create the individual joinings 120 along an edge of each adjoining solar modules 110. With reference to an embodiment of FIG. 1A, the joinings 120 provided by the combination of horizontal frame members 106 extending horizontally. The joinings 120 in each column of array 100 may seal or weatherproof the solar modules 110 against the environment, without need for glazing or glass layers or other additive thicknesses that are applied over the modules or the array 100 as a whole.

In an embodiment, the joinings 120 are structural features that create flashing and counter-flashing edges between adjacent interior frames. In another embodiment, the joinings include or are otherwise provided by additional members and/or features for sealing or flashing. Examples of such additional members and/or features include gaskets, applied sealants such as silicone, or joint members.

While an embodiment of FIG. 1A shows use of joinings in only one direction (horizontally or spanning between rails 135) one or more variations provide for use of joinings 120 of adjacent frame members in both horizontal and vertical directions. For example, one or more embodiments provide that adjacent columns of array 100 may be adjoined and formed from frame members that include features for forming joinings between solar modules of adjacent columns.

In an embodiment, the vertical frame member 105 that supports each column may be compressed or otherwise retain each solar module within the larger array so that it is sealed. For example, some or all of the vertical frame members 105 may coincide in position with a corresponding one of the rails 135. Each rail 135 may cause the corresponding vertical frame member to compress the solar module from the edge against the rail 135, so as to seal that edge of the solar module into the array as a whole.

Alternatively, one or more embodiments provide for one or more of the vertical frame members 105 to use structural or additive features for sealing or weather-guarding individual solar modules in retention.

Any of the joinings 120 may provide seals that preclude entrance of water, air, or other elements of the environment. Alternatively, some or all of the joinings 120 may provide flashing by directing fluid without sealing the exterior formed by the solar modules.

In addition to joinings 120, one or more embodiments provide for the use of integrated electrical connectors (IEC) 130, 130 that extend electrical connectivity from one module to another. The IEC 130 includes electrical connectors embedded or otherwise integrated with vertical frame members 105 and/or horizontal frame members 106. The IEC 130 may serve to provide multiple polarities, including ground, and/or carry charge or current produced from any of the solar modules 110.

Figure 1B:
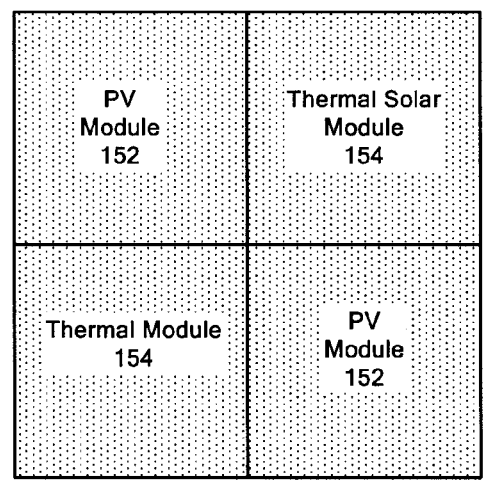
FIG. 1B illustrates an implementation of an embodiment shown by FIG. 1A.

FIG. 1B illustrates an implementation of an embodiment shown by FIG. 1A. In FIG. 1B, array 100 comprises both solar photovoltaic modules 152 which use solar energy to generate electricity, and thermal modules 154 which use solar energy to generate heat. The combination may thus enable electricity generation, heating, applications of heating, cooling, and applications of cooling. A combination such as shown by an embodiment of FIG. 1B may be combined and used with features and structures described with an embodiment of FIG. 1A. A mixed configuration such as illustrated by FIG. 1B may be used with any of the embodiments described herein. The actual placement and arrangement of solar thermal modules 154 and solar photovoltaic modules 152 within the array may vary.

In an embodiment of FIG. 1B, the IEC 130 may serve to connect adjacent photovoltaic modules 152 and pass underneath thermal modules 154 without electrical connectivity. Plenums (not shown) for carrying heat or air may pass underneath thermal modules 154 for effect, while also underlying photovoltaic modules 152 as air is passed or pushed under the array 100.

Figure 1C:
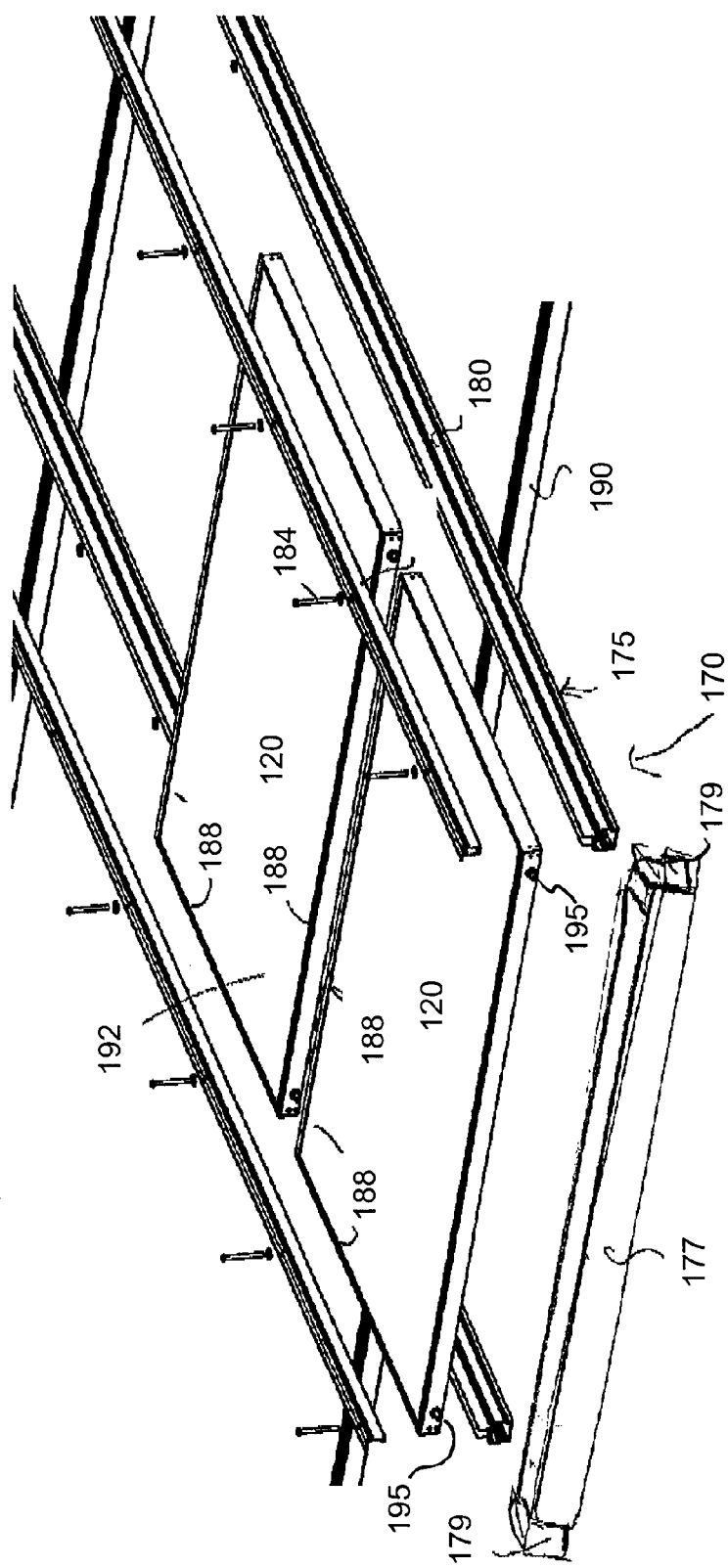
FIG. 1C illustrates an assembly for securing a solar module array to an underlying surface, under an embodiment of the invention.

FIG. 1C illustrates an assembly for securing a solar module array to an underlying surface, under an embodiment of the invention. In an embodiment, a primary support structure 170 includes a plurality of support structure members. The support structure members include rails 175, which secure one or more solar modules 110 to the underlying surface. The rails 175 may correspond or be equivalent to rails 135 such as shown in FIG. 1A. As such, the rails 175 may be referenced as aligning vertically, so as to define vertical seams in a solar panel array.

Each solar panel module 110 may include frame members 188 that support and retain individual panels 192 (e.g. PV laminate) from the edge or boundary of the panel. In the horizontal and vertical reference provided, frame members 188 may extend horizontally between rails 175 and vertically so as to be co-linear with rails.

The primary support structure 170 may be configured to support both incline and flat mountings. With incline mountings, an embodiment of FIG. 1C may be combined with one or more other embodiments described herein to promote or facilitate the movement of water over the solar modules 110. With flat mountings, an embodiment of FIG. 1C may be combined with other embodiments to inhibit intrusion of water and debris into an interior space between the underlying surface and the solar module array.

In an embodiment, each rail 175 includes a base member 180 and a compression member 182. The compression member 182 may secure to an edge of a corresponding solar module 110. Bolts 184 or other mechanisms may be used to compress the member 182 against the base member, thereby securing the corresponding solar module 110 at one edge to the base member 180. The base member itself may be secured directly or indirectly to the underlying surface. In one embodiment, struts 190 may mount horizontally (to the vertical direction of the rails 175) to the underlying surface, and the rails 175 may mount to the struts 190.

The solar module array may be sealed or weather-proofed at the following locations: (i) between the primary support structure 170 and the underlying surface; (ii) between the vertical frame members 188 and the solar module 110; and (iii) between adjacent solar modules in the horizontal direction.

In order to seal or weather-proof the support structure 170, the rails 175 may be provided with flashing and/or a seal to the underlying surface, along a length of the rails 175. With reference to an embodiment of FIG. 1A, a length of the rails 175 may correspond to the lateral sides 104, 104 of the array 100. The primary support structure 170 may also include one or more additional perimeter support member 177 that span horizontally between the rails 175. With reference to FIG. 1A, the additional perimeter support member 177 may form the top side 102 and may also be flashed or sealed against the underlying surface. In addition, corner elements 179 may be provided that join the spanning perimeter support member 177 and the rails 175. The corner elements 179 may also include corner flashing or sealing against the underlying surface. U.S. patent application Ser. No. 11/332,000 (incorporated by reference herein), for example, provides various techniques for weather-proofing and flashing the primary support structure 170 in a manner described.

According to an embodiment, application of the compression member 182 to the base member 180 while gripping or retaining an edge of solar module 110 may be used to provide sealing or weather-proofing of the vertical seam formed between the vertical frame member 188 of the solar module 110 and the rail 175 of the primary support structure. However, one or more variations are contemplated, where gaskets or structures are used to enhance or create a seal or weather-proofing between the primary support structure 170 and the solar module 110.

In order to seal or weather-guard the solar modules along the horizontal seams, one or more embodiments provide that the frame members 188 are provided features or structural configurations for effectuating flashing, shingling or sealing. Accordingly, the horizontal frame members 188 (and/or the manner in which the horizontal frame members adjoin one another) may be constructed according to any of the embodiments described below and elsewhere in this application.

Figure 10:
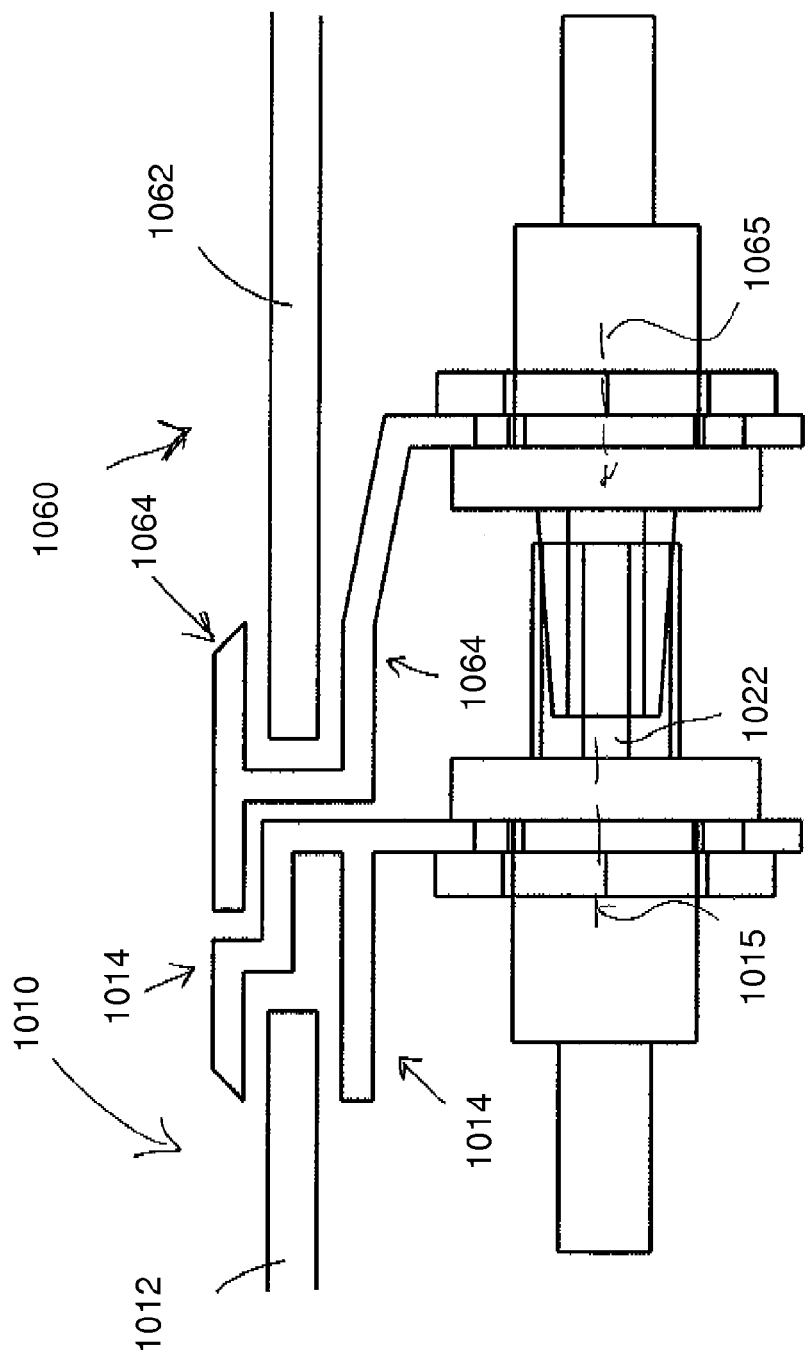
FIG. 10 is a side view of adjacent solar modules having integrated electrical connectivity extending therebetween, under an embodiment of the invention.
Figure 11:
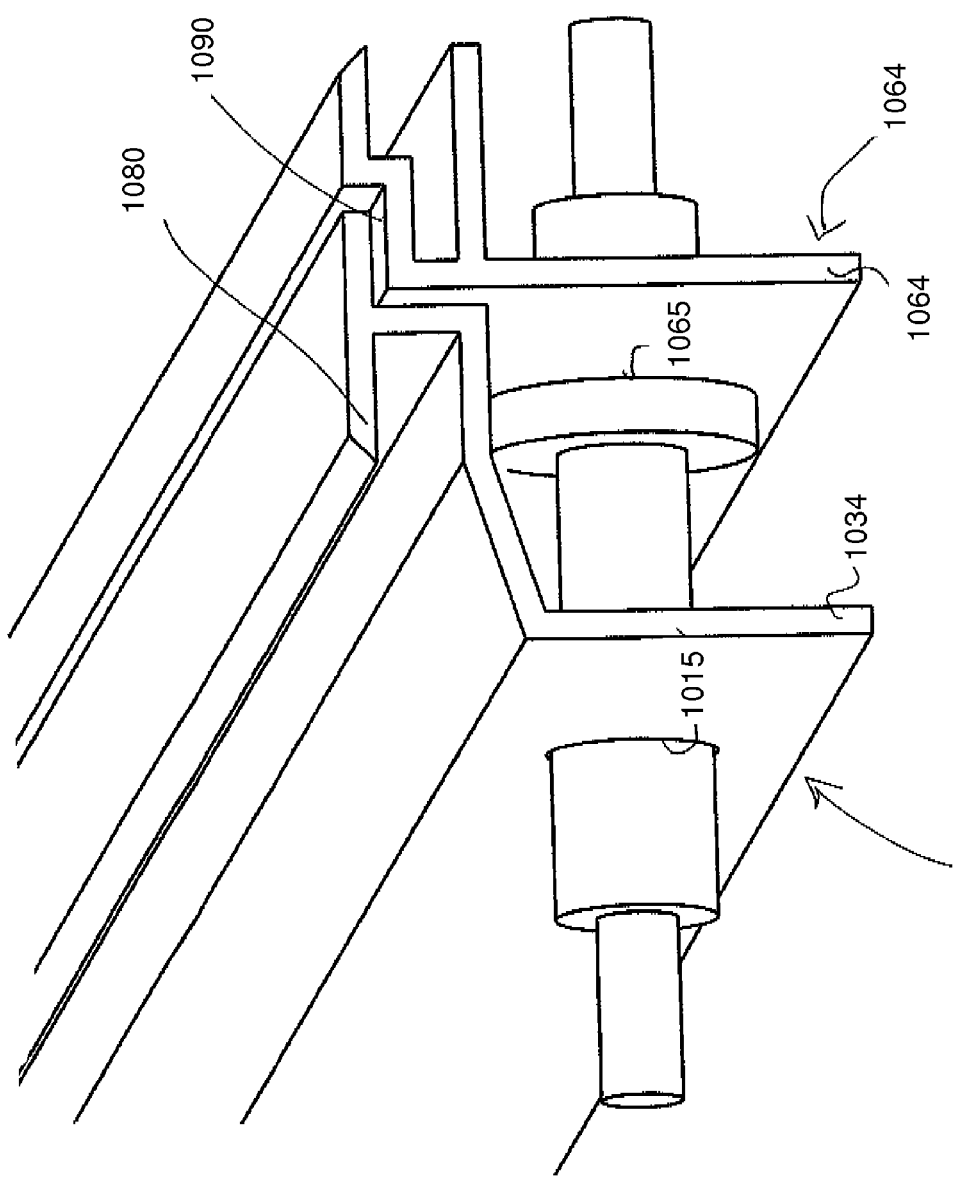
FIG. 11 is an isometric view of an embodiment of FIG. 10.

With reference to embodiments of FIG. 10 and FIG. 11, FIG. 1C also illustrates the passage of electrical connectors 195 from one solar module 120 to another. The manner in which the electrical connectors 195 may be combined or integrated with the frame members 188 of the solar modules 120 is described below.

Figure 2:
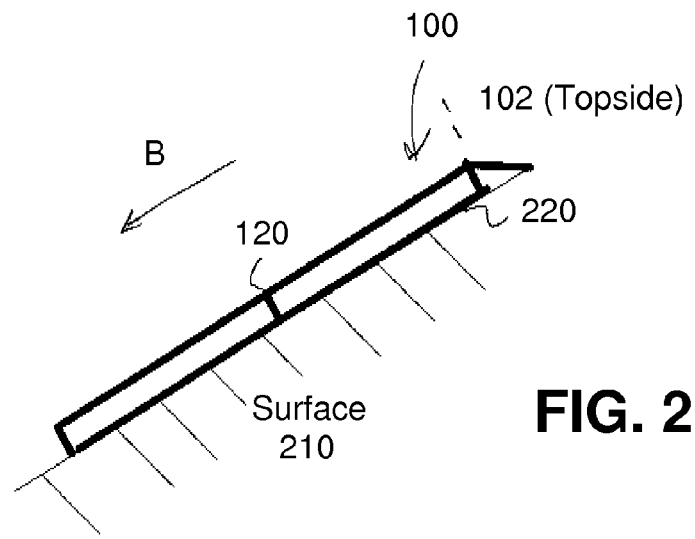
FIG. 2 is a side view of array 100, as mounted on an underlying surface 210, according to one or more embodiments of the invention.
Figure 3:
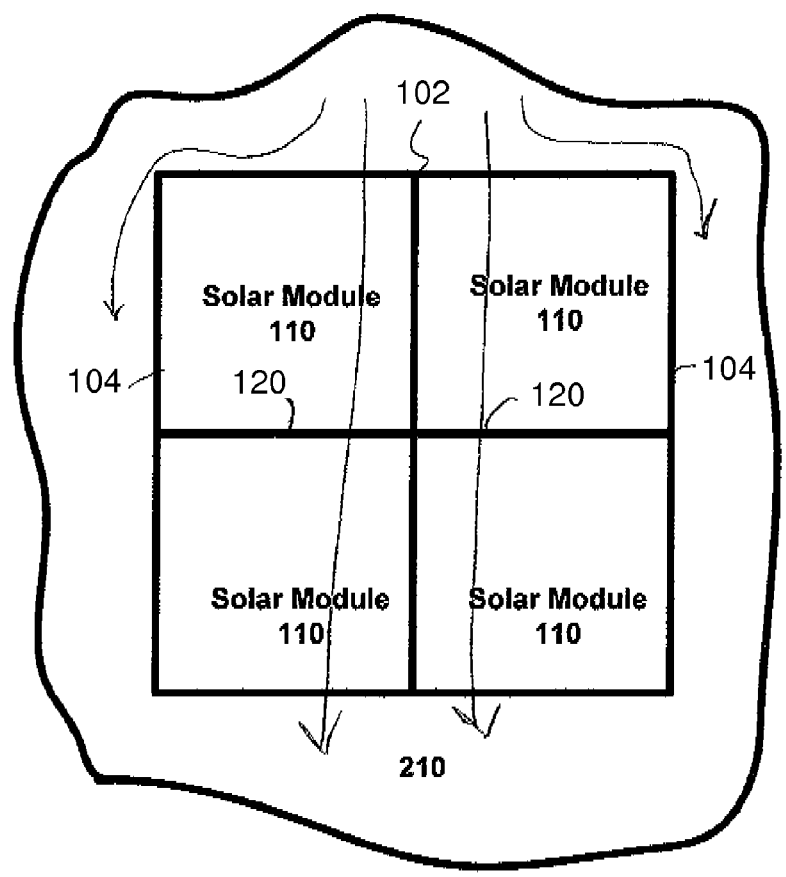
FIG. 3 illustrates path flows of water from rain flow, when array is mounted to an inclined surface, under an embodiment of the invention.

FIG. 2 is a side view of array 100, as mounted on an underlying surface 210, according to one or more embodiments of the invention. Embodiments described herein enable solar modules 110 to be mounted to either weather-guard or seal interior spaces 220 against intrusions of air, water or other undesirable environmental elements. When the underlying surface 210 is inclined, the manner in which water (e.g. from rain flow) is handled with the presence of a solar array is of concern. In order to weather-proof or seal the interior spaces 220 from the environment, one or more embodiments provide that water flow (e.g. from rain) is directed from the top side 102 downward so as to cascade across the surface of the solar modules 110. Embodiments allow for the passage of water over the solar modules by including joinings 120 that preclude substantial intrusion of water into the interior space 220. As such, the array 100 may be weather-guarded or sealed by a combination of (i) the joining 120 between solar modules 110, (ii) the force provided by the rails 135 or other support structures through the vertical frame members 105 (which are co-linear with the rails) to effect a seal between them, and (iii) the flashing or sealing of the rails 135 and other perimeter members to the underlying surface, FIG. 3 illustrates path flows of water from rain flow, when array 100 is mounted to an inclined surface, under an embodiment of the invention. In FIG. 3, one path of water flow is across solar module 110. As mentioned, the joinings 120 preclude or inhibit water from entering (substantially or completely) the interior spaces 220 (FIG. 2). One or more embodiments also facilitate and/or protect water flow around the array 100. As described below, vertical frame members 105 that are co-linear with lateral sides 104, 104 of array 100 may be flashed or sealed against the underlying surface 210 to protect water seepage into the perimeter of the underlying space 220.

Structuring of Frame Members for Flashing Effect

Figure 4:
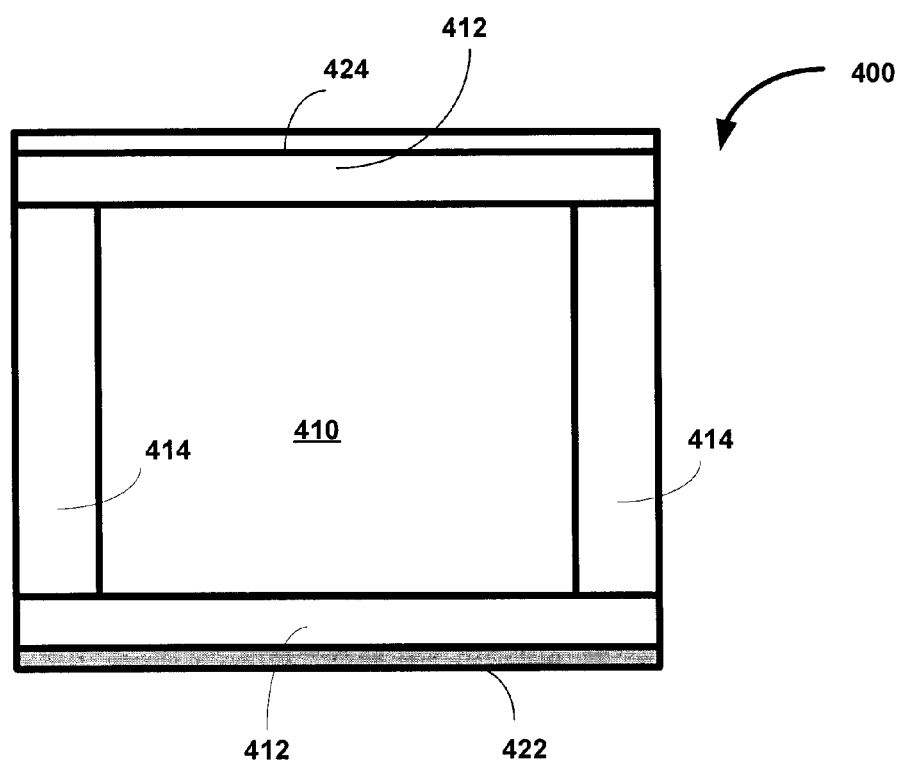
FIG. 4 is a top view of a frame assembly formed from a set of frame members and constructed to support a solar panel, according to an embodiment of the invention.

FIG. 4 is a top view of a frame assembly formed from a set of frame members and constructed to support a solar panel, according to an embodiment of the invention. A frame assembly 400 may be rectangular, so as to include frame members that are referenced as horizontal members 412 and vertical members 414. Reference to a horizontal and vertical direction is arbitrary, but for purpose of an implementation being described, the vertical direction may reflect a direction of water flow as a result of gravity. To this end, the frame assembly 400 may be assumed to be mounted or for mounting on an incline surface, although incline mounting is not necessary. In one implementation, vertical members 414 are aligned and coupled to support rails 135 (FIG. 1). The rails 135 (see FIG. 1A) may employ compression to retain the solar modules in place. For example, U.S. patent application Ser. No. 11/332,000 (which is incorporated by reference herein) describes a rail construction that uses compression to retain a solar module. As vertical members 414 may form a part of the rails and thus compress the solar modules, the vertical members may inherently weather-guard or seal edges where the solar modules are held.

In an embodiment, individual horizontal members 412 include one or more sealing features that serve to weather-guard the solar module to solar module transition in the vertical direction. The sealing features may include or correspond to a structural feature that is integrated into the frame member 412. In one embodiment, each horizontal frame member 412 includes one of an overlap frame thickness 422 (e.g. protrusion) or a recess platform 424 for receiving an overlap protrusion. As described in an embodiment of FIG. 5A and FIG. 6, frame assembly 400 may be configured to position the recess platform 424 adjacent and downhill (in the vertical direction) from an overlap frame thickness of an adjacent frame member that is part of another uphill set of frame members. Likewise, frame assembly 400 may be configured to position the overlap frame thickness 422 uphill from a recess platform of an adjacent set of frame members.

Figure 5A:
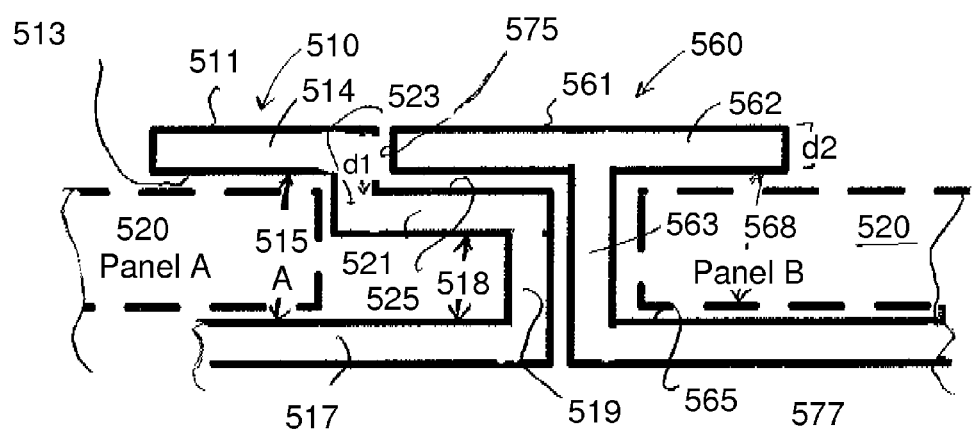
FIG. 5A is a side-cross sectional view of a first pair of adjoining interior frame members in an assembly for a solar module array, according to an embodiment of the invention.

FIG. 5A is a side-cross sectional view of a first pair of adjoining interior frame members in an assembly for a solar module array, according to an embodiment of the invention. The pair of adjoining interior frame members include a first interior frame member 510 and a second interior frame member 560. When mounted on an incline, second interior frame member 560 is uphill from the first interior frame member 510, as shown by an Arrow A. Each interior frame member 510, 560 is structured to hold and support a corresponding solar collective panel 520. The panel 520 may correspond to, for example, laminate for photovoltaic panels, or a glazing element for thermal modules.

The various members of the first interior frame member 510 form an opening 515 that receives the corresponding solar panel 520. The opening 515 may be formed by an underside 513 of an exterior segment 514, as positioned over a base segment 517. A first height segment 519 may extend from base segment 517 partially towards exterior segment 514. The first wall (or height segment) 519 may join a platform segment 521, which may extend parallel or substantially parallel to the base segment 517. A second wall 523 may extend from the platform segment 521 to the exterior segment 514.

The space defined by the distance between the platform segment 521 and the base segment 517 may define an opening 518 which is smaller than a dimension of the cross section of the solar panels 520. In this regard, the opening 518 serves as a buffer space to enable the use of a recess platform surface 525 of the platform segment 521 to receive an extension member from the second interior frame member. Furthermore, each interior frame member 510, 560 may extend to and couple to other orthogonally aligned frame members (See FIG. 4), and therefore leverage support from one of the corresponding rails 135 to support the solar module.

A depth distance (d1) of the recess platform surface 525 may be measured as corresponding to a height of the second wall 523 (and a distance to an exterior surface 511 provided by the exterior segment 514). The depth distance d1 may be greater than or substantially equivalent to a thickness dimension of an extension provided by the second interior frame segment 560.

The second interior frame member 560 includes an opening 568 having an extended exterior segment 562, a wall segment 563, and a base segment 565. A space between the base segment 565 and the extended segment member 562 defines the opening 568 where the corresponding solar panel 520 is received and supported. In an embodiment, the wall segment 563 extends sufficiently from the base segment 565 so that the extended exterior segment 562 is positioned above the raised platform surface 535 of the adjacent first interior frame segment 510. In an embodiment, a thickness (d2) of the extended exterior segment 562 is dimensioned to be less than the depth distance (d1) provided by the recess platform surface 525. In this way, the extended exterior segment 562 may be accommodated over the recessed platform surface 525. Moreover, the dimension of the depth distance (d1) and the thickness (d2) of the extended exterior segment 562 may be such that the exterior surface 511 of the exterior segment 514 of the first interior frame member 510 is substantially flush with the exterior surface 561 of the extended exterior segment 562 of the second interior frame member 560.

When mounted on an incline, the combination of the first and second horizontal frame members result in a shingle-like or flashing effect in which water is passed over the exterior of the combined structure (with solar modules). Water may pass downhill (as shown by directional Arrow A). When mounted at an incline, water may pass from the second solar module 520 to the first solar module, and any water that falls in a gap 575 formed by the joining of the first and second horizontal frame members will not be inclined to travel uphill on the recessed platform surface 525. An interior space 577 may thus be substantially protected from intrusion of water, even when water cascades over the combined surfaces formed by the solar panels 520 and frame members.

Figure 5B:
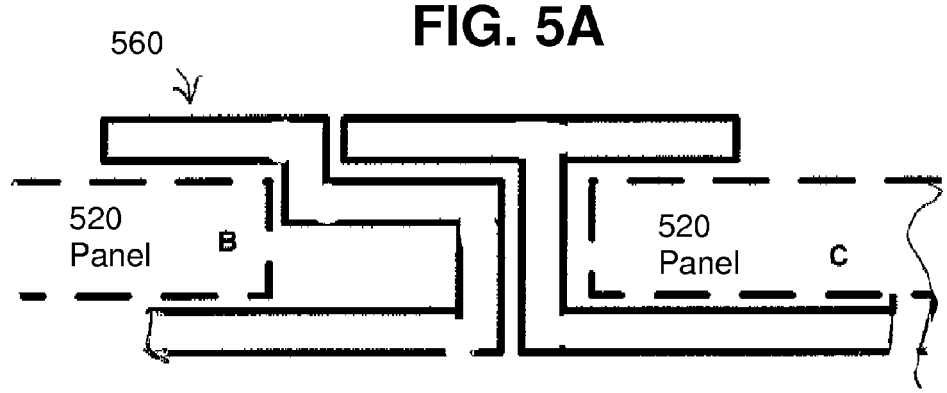
FIG. 5B is a side-cross sectional view of a second pair of adjoining interior frame members in an assembly for a solar module array, according to an embodiment of the invention.

FIG. 5B is a side-cross sectional view of a second pair of adjoining interior frame members in an assembly for a solar module array, according to an embodiment of the invention. FIG. 5B may substantially duplicate an embodiment such as shown by FIG. 5A, but illustrate a point that the frame assembly of any one solar panel 520 may include both the recessed platform surface 525 and the extended exterior segment 562 which provides a thickness that is received on a recessed platform surface on the frame assembly of a neighboring solar panel. In an embodiment of FIG. 5B, the solar panel ("B") of the second interior frame member is shown having the receiving platform surface 525 (as shown and described with FIG. 5A for the first interior frame member 510). Thus, any given solar panel 520 may include the recess platform surface 525 on one frame member that is uphill on an inclined array, and the extended exterior segment 562 at the other diametric frame member positioned downhill on the inclined array.

Figure 6:
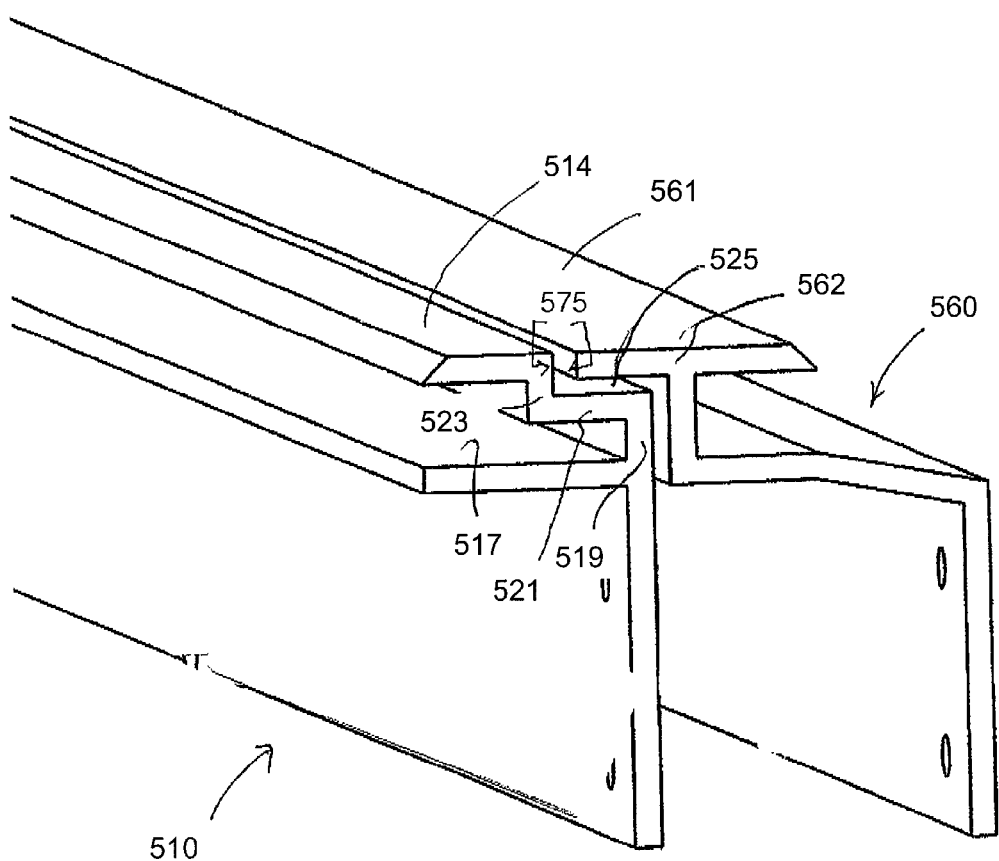
FIG. 6 is an isometric view of an embodiment such as shown by FIG. 5A and FIG. 5B, without inclusion of solar panels.

FIG. 6 is an isometric view of an embodiment such as shown by FIG. 5A and FIG. 5B, without inclusion of solar panels 520. The interior frame members 510, 560 may form a joining through structures formed on each respective frame member. The first frame 510 includes an exterior segment 514, base segment 517, first wall 519 which raises to platform segment 521. The recessed platform surface 525 may be formed on the platform segment 521. The second wall 523 may extend form the recessed platform surface 525 to the exterior segment 514. The second interior frame member 560 includes extended exterior segment 562 that overlaps onto the recessed platform surface 525. The opening 568 (FIG. 5A) may be defined by a portion of the extended exterior segment 562 and the base 565.

In an embodiment such as shown by FIG. 6, the extended exterior segment 562 of the second interior segment 560, and the manner in which the exterior segment 562 is accommodated onto the recessed platform 525 of the first interior segment 510, provides one form of an overlap frame thickness from which a shingle or flashing affect may be provided. Still further, gaskets or other materials may be used to further seal the joining formed with the overlap frame thickness. With loose fitting, some water may enter the gap 575 (see FIG. 5A), but the water may be precluded or inhibited from traveling across recessed platform surface 525, particularly when an incline mount is used. With tight fitting, gaskets or other structures, seal may be formed that substantially precludes water from entering the sealed portion within the gap 575 even when the arrays are mounted level instead of on an inclined surface.

Alternatives to Structuring of Frame Members

Figure 8:
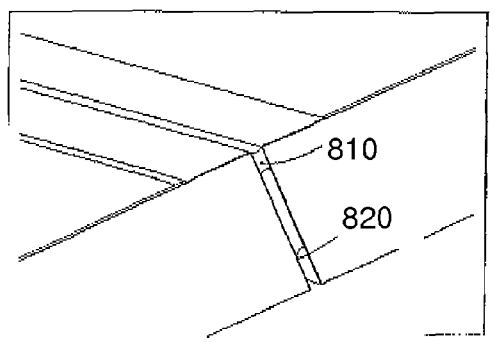
FIG. 8 illustrates an alternative embodiment in which a gasket or similar component is fitted or applied into a gap between the horizontal frame members of adjacent solar modules, according to one or more embodiments.
Figure 7:
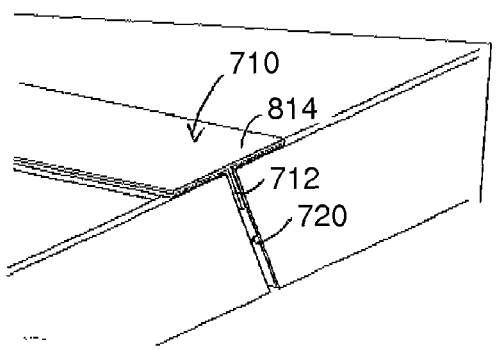
FIG. 7 illustrates an alternative embodiment in which an additional component or member is provided to seal or provide flashing between adjoining frame members, according to one or more embodiments of the invention.

FIG. 7 illustrates an alternative embodiment in which an additional component or member is provided to seal or provide flashing between adjoining frame members, according to one or more embodiments of the invention. Rather than include flash/counter-flash structures with frame members (e.g. recess and overlap), an embodiment of FIG. 7 provides for use of a gap member 710 that extends between rail members or other supports (not shown in FIG. 7) that support adjacent solar modules. In an embodiment, the gap member may include a T-shape cross section, so that a length of the member fits within a gap formed by adjacent horizontal frame members. In contrast to, for example, embodiments of FIG. 5A, FIG. 5B, and FIG. 6, the surfaces of adjoining interior members may be relatively smooth to receive and retain a length segment 712 of gap member 710. A flange 714 may extend between the pair of adjacent interior members to block the entrance of water into the gap 720. Additional weatherproofing may be achieved by placing a gasket between segment 712 or flange 714 and the mating frame members FIG. 8 illustrates an alternative embodiment in which a gasket or similar component is fitted or applied into a gap between the horizontal frame members of adjacent solar modules, according to one or more embodiments. In contrast to, for example, embodiments of FIG. 5A, FIG. 5B, and FIG.

6, the surfaces of adjoining interior members may be relatively smooth to form a gap 820. The gap 820 may receive a gasket component 810, filler or other form of deformable material. The effect is to seal the gap 820, thereby enabling water to pass from one solar module to another without entering an interior space of the array beneath the solar modules. The gasket component 810 may flange or spread over adjoining frame members to provide a seal.

Uphill Flashing and Water Guide

With reference to FIG. 2, solar module arrays are often mounted on inclines. In such cases, rain water and precipitation can collect on a top surface. A perimeter flashing or seal (such as described in U.S. patent application Ser. No. 11/332,000) may be used to preclude or inhibit rain water from entering the interior of the solar module array from a perimeter surface. But water may pool at the top end of the array, and on structures such as rooftops, the pooling may have undesirable consequences.

According to an embodiment, the effects of pooling may be mitigated or even eliminated by enabling water to cascade downhill over the array of solar modules. With reference to an embodiment of FIG. 2, water may flow along a directional arrow B. As described herein, embodiments such as described with FIG. 4-7. The use of flashing or sealing between frame members that support solar panel modules enables the water to pass over the adjoining solar modules without intrusion of water into the interior space of the array beneath the solar module.

Figure 9:
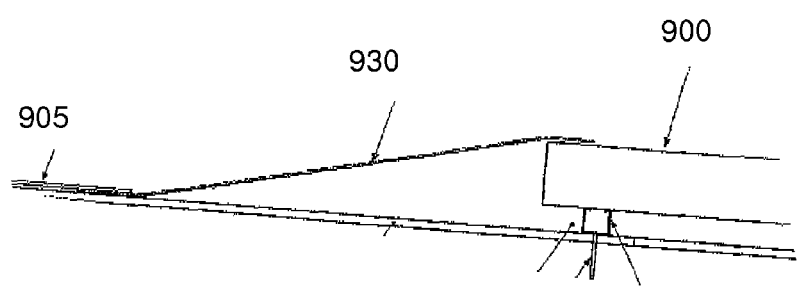
FIG. 9 illustrates an embodiment in which flashing and other structures are used to guide water over the solar modules.

FIG. 9 illustrates an embodiment in which flashing and other structures are used to guide water over the solar modules. A flashing component 930 may be installed under a roof covering 905 and extended to overlay the solar module array 900. This results in water running down the roof to be conveyed from the roof covering 905 up onto the array 900. In one embodiment, the flashing component may include two sections (i.e. flashing and counter-flashing). One benefit provided by flashing component 930 is that it eliminates the pooling of water, snow, ice, or other debris behind (i.e. adjacent top side 102) the solar module array 900.

Electrical Connectivity

One or more embodiments provide interlocking solar modules that electrically connect during the assembly of individual modules into the racking structure for a given solar array. Such embodiments may eliminate a secondary step of having to hand-connect the wiring (both module potential and grounding) after the modules are physically placed According to one or more embodiments, the electrical connectors are embedded in the frames of the modules, such that when two modules are slid together during assembly, the electrical interconnections between adjacent modules are simultaneously formed.

FIG. 1A illustrates one alignment of electrical wiring or lines for an array of solar modules. In one embodiment, the electrical line may extend in a direction of the rail 135 or other support structure. As described, each solar module includes electrical connectors for extending electrical connectivity to an adjacent solar panel.

FIG. 10 is a side view of adjacent solar modules having integrated electrical connectivity extending therebetween, under an embodiment of the invention. A first solar module 1010 may include a panel 1012 and a frame member 1014. Likewise, a second solar module 1060 may include a panel 1062 and a frame member 1064. Each of the solar modules 1010 and 1060 may include a respective integrated electrical connector 1020, 1070. The electrical connectors 1020, 1070 may provide respective electrical leads or wiring. The connectors 1020, 1070 (as well as conduits for the leads) are integrated through holes 1015, 1065 formed in the respective frame members 1014, 1064. The connectors 1020, 1070 may each be secured by a locking nut on the opposite side of the respective frame member 1014, 1064 to hold them captive. In alternate configurations, the connectors may be press fit, snapped, or otherwise secured into the module frames or the solar panels themselves.

FIG. 11 is an isometric view of an embodiment of FIG. 10, illustrating use of the integrated electrical connectors 1020, 1070 (not visible in FIG. 11) formed in frame members 1014, 1064. Each frame member 1014, 1064 may include an inward extension 1034, 1064 in which the holes 1015, 1065 may be formed for receiving and retaining the respective electrical connectors 1020, 1070. An embodiment such as shown and described with FIG. 10 and FIG. 11 may incorporate features or components of other embodiments described herein. In particular, the electrical connectors 1020, 1070 may be integrated into frame members 1014, 1064 that include structures of an overlap frame thickness 1080 and a recessed platform 1090 for receiving the overlap thickness. As described with or similar to, for example, an embodiment of FIG. 4, FIG. 5A and FIG. 5B, overlap frame thickness 1080 and recessed platform 1090 may seal or hinder intrusion of water or other environmental factors.

While an embodiment shown with FIG. 10 and FIG. 11 assumes that the connections are made during lateral assembly of the modules, alternate configurations are possible. One such configuration may have the connectors oriented in a vertical arrangement requiring the modules to be laid in from a vertical direction on their common edge as opposed to laterally sliding the modules together. In such an arrangement, connectors are oriented to line up with connectors on adjoining modules so that lower modules connect to modules above them.

Only one set of connectors between modules are required for powering the system if the modules are series connected as is typical, but a second set can be used as a grounding loop. Alternately, a single multi-pole connector could be used to provide multiple electrical connections at a single location.

CONCLUSION

Although the descriptions above contain many specifics, these should not be construed as limiting the scope of the invention but as merely providing illustrations of some embodiments.

The invention claimed is:

1. A frame assembly for a solar panel, the frame comprising:
    a plurality of frame members that are structured to collectively support and hold a first solar module;
    wherein at least one of the plurality of frame members is structured to adjoin a frame member of a second solar module in forming a joining with the frame member of the second solar module over a length where the frame member of the first and second solar module adjoin;
    wherein at least one of the plurality of frame members includes an embedded electrical connector for connecting to a frame member that supports and holds the second solar module;
    wherein the at least one of the plurality of frame members is shaped to receive an overlap frame thickness that extends from the frame member of the second solar module in forming the joining; and
    wherein the at least one of the plurality of frame members is shaped to extend an overlap frame thickness to the frame member of the second solar module in forming the joining with the frame member of the second solar module.

2. The frame assembly of claim 1, wherein the joining formed by the at least one of the frame members and the frame member of the second solar module substantially precludes intrusion of at least one of external air or water into a space underlying the first module and the second module at the length where the frame member of the first and second solar module adjoin.

3. The frame assembly of claim 1, wherein the at least one of the plurality of frame members includes a perimeter recessed platform that extends lengthwise on the at least one of the frame members, wherein the recess platform is dimensioned to receive the overlap thickness extending from the frame member of the second solar module. .

4. The frame assembly of claim 3, wherein the recessed platform is provided against an exterior surface of the at least one frame member, the exterior surface extending lengthwise on the at least one of the frame members, and wherein a depth distance between the recessed platform and the exterior surface is substantially equivalent or less than a dimension of the overlap frame thickness.

5. A frame assembly for a solar panel, the frame comprising:
a plurality of frame members that are structured to collectively support and hold a first solar module;
wherein at least one of the plurality of frame members is structured to adjoin a frame member of a second solar module in forming a joining with the frame member of the second solar module over a length where the frame member of the first and second solar module adjoin. wherein the at least one of the plurality of frame members is shaped to receive an overlap frame thickness that extends from the frame member of the second solar module in forming the joining;
wherein the at least one of the plurality of frame members includes a perimeter recessed platform that extends lengthwise on the at least one of the frame members, wherein the recess platform is dimensioned to receive the overlap frame thickness extending from the frame member of the second solar module;
wherein another of the plurality of frame members is structured to adjoin a frame member of a third solar module in forming a joining with the frame member of the third solar module over a length where the frame member of the first and third solar module adjoin;
wherein another of the plurality of frame members is structured to adjoin a frame member of a third solar module in forming a joining with the frame member of the third solar module over a length where the frame member of the first and third solar module adjoin.

6. The frame assembly of claim 5, wherein the another of the plurality of frame members is shaped to extend an overlap frame thickness to the frame member of the third solar module in forming the joining with the frame member of the third solar module.

7. The frame assembly of claim 6, wherein one or more of the frame members includes an integrated electrical connector.

8. A frame assembly for a solar panel, the frame comprising:
a plurality of frame members that are structured to collectively support and hold a first solar module;
wherein the plurality of frame members includes a first frame member that provides an overlap frame thickness a distance outward from the first frame member, wherein the overlap frame thickness is extended outward in a lengthwise direction of the first frame member; and
wherein the plurality of frame members includes a second frame member that includes a perimeter recessed platform that is extended in a lengthwise direction of the second member, wherein the recessed platform is provided against an exterior surface of the second frame member to define a depth distance between the recessed platform and the exterior surface;
wherein a dimension of the overlap frame thickness is substantially equivalent to the depth distance.

9. The frame assembly of claim 8, wherein a dimension of the overlap frame thickness is substantially equivalent to the depth distance.

10. A frame assembly for a solar panel, the frame comprising:
a plurality of frame members that are structured to collectively support and hold a first solar module;
wherein the plurality of frame members includes a first frame member that provides an overlap frame thickness a distance outward from the first frame member, wherein the overlap frame thickness is extended outward in a lengthwise direction of the first frame member; and
wherein the plurality of frame members includes a second frame member that includes a perimeter recessed platform that is extended in a lengthwise direction of the second member, wherein the recessed platform is provided against an exterior surface of the second frame member to define a depth distance between the recessed platform and the exterior surface;
wherein the first frame member and the second frame member are provided on opposite sides of a rectangular support frame formed by the plurality of frame members.

11. The frame assembly of claim 8, wherein one or more of the frame members includes an integrated electrical connector.

12. The frame assembly of claim 8, further comprising a primary support structure, wherein the primary support structure support a plurality of solar modules in a raised and inclined position over an underlying body.

13. A solar module assembly comprising:
a plurality of solar modules;
a frame assembly comprising a plurality of frame members, the plurality of frame members including multiple sets of frame members, wherein each set of frame members combines to support a corresponding solar module in position;
wherein the plurality of frame members include a pair of adjoining frame members, the pair of adjoining frame members include a frame member of a first set of frame members that adjoins a frame member of a second frame member;
a sealing feature provided for the pair of adjoining frame members to substantially preclude intrusion of at least one of external air or water into a space underlying a solar module of the first set or of the second set;
wherein the sealing feature comprises a perimeter flashing structure that flashes the frame assembly with an underlying structure.

14. The solar assembly of claim 13, wherein the sealing feature includes a gasket provided between the frame member of the first set of frame members and the frame member of the second set of frame members.

15. The solar assembly of claim 13, wherein the sealing feature includes a sealing member that is separate from the pair of adjoining frame members.

16. The solar assembly of claim 15, wherein the sealing member extends lengthwise between the pair of adjoining frame members and extends a length at least partially into a gap formed between the pair of adjoining frame members.

17. The solar assembly of claim 16, wherein the sealing member has a T-shape cross-section.

18. The solar assembly of claim 13, wherein the sealing feature comprises:
   an overlap frame thickness extending from one of the pair of adjoining frame members, the overlap frame thickness extending outward and along a lengthwise direction of that one of the pair of adjoining frame members;
   a recessed platform provided on a perimeter of the other one of the pair of adjoining frame members, the recessed platform extending in a lengthwise direction of the other one of the pair of adjoining frame members, wherein the recessed platform is provided against an exterior surface of the other one of the pair of adjoining frame members, and wherein the recessed platform is dimensioned to receive the overlap frame thickness.

19. The solar assembly of claim 18, wherein a depth distance between the recessed platform and the exterior surface is substantially equivalent to or less than a dimension of the overlap frame thickness.

20. The solar assembly of claim 13, further comprising a primary support structure that secures the plurality of frame members to an underlying body, and wherein the primary support structure and the plurality of frame members combine to support a plurality of solar modules in a raised and inclined position over the underlying body.

21. A solar module assembly comprising:
   a plurality of solar modules;
   a frame assembly comprising a plurality of frame members, the plurality of frame members including multiple sets of frame members, wherein each set of frame members combines to support a corresponding solar module in position;
   wherein the plurality of frame members include a pair of adjoining frame members, the pair of adjoining frame members include a frame member of a first set of frame members that adjoins a frame member of a second frame member;
   a sealing feature provided for the pair of adjoining frame members to substantially preclude intrusion of at least one of external air or water into a space underlying a solar module of the first set or of the second set further comprising a primary support structure that secures the plurality of frame members to an underlying body, and wherein the primary support structure and the plurality of frame members combine to support a plurality of solar modules in a raised and inclined position over the underlying body;
   wherein the primary support structure includes one or more rails that use compression to secure at least a portion of a corresponding solar module to the underlying body.

22. The solar assembly of claim 21, wherein the primary support structure forms at least a portion of a perimeter that includes one or more of a lateral side, a top side, or a bottom side, and wherein anyone of the individual frame members that form the pair of lateral sides, the top side or the bottom side are provided with one or more features that form a seal with the underlying body.

23. The solar assembly of claim 22, wherein the primary support structure includes one or more corner frame components that individually connect a support structure member that forms at least a portion of the top side with a support structure member that forms at least a portion of one of the pair of lateral sides.

24. The solar assembly of claim 23, wherein the one or more corner elements are provided with one or more features to seal each of the one or more corner elements to the underlying body.

25. The solar assembly of claim 22, wherein the primary support structure is structured or provided flashing to facilitate flow of water from the top side downward over one or more of the solar modules.

26. The solar assembly of claim 13, wherein one or more of the plurality of frame members each include or are coupled to an integrated electrical component that is positioned to mate with an integrated electrical component of an adjacent frame member.

27. The solar assembly of claim 26, wherein a frame member of a first set of frame members includes or is coupled to a first integrated electrical connector, and wherein a frame member of a second set of frame members includes or is coupled to a second integrated electrical connector, wherein a solar module of the first set of frame members is positioned adjacent to a solar module of the second set of frame members, and wherein the first integrated electrical connector is positioned to mate with the second integrated electrical connector with assembly of the first set of frame members and the second set of frame members.

28. The solar assembly of claim 13, wherein the plurality of solar modules include at least one or more thermal modules.

* * * * *